United States Patent [19]

Henderson

[11] Patent Number: 5,450,165
[45] Date of Patent: Sep. 12, 1995

[54] SYSTEM FOR IDENTIFYING AREAS IN PRE-EXISTING IMAGE DATA AS TEST PATCHES FOR PRINT QUALITY MEASUREMENT

[75] Inventor: Thomas A. Henderson, Rochester, N.Y.

[73] Assignee: Xerox Corporation, Stamford, Conn.

[21] Appl. No.: 200,601

[22] Filed: Feb. 23, 1994

[51] Int. Cl.⁶ .............................................. G03G 21/00
[52] U.S. Cl. ..................................... 355/208; 355/246
[58] Field of Search ............... 355/203, 204, 208, 214, 355/246

[56] References Cited

U.S. PATENT DOCUMENTS

| | | | |
|---|---|---|---|
| 4,341,461 | 7/1982 | Fantozzi | 355/246 |
| 4,684,243 | 8/1987 | Minor | 355/317 |
| 4,894,685 | 1/1990 | Shoji | 355/246 |
| 5,060,013 | 10/1991 | Spence | 355/208 |
| 5,253,018 | 10/1993 | Takeuchi et al. | 355/246 |
| 5,266,997 | 11/1993 | Nakane et al. | 355/208 |
| 5,315,352 | 5/1994 | Nakane et al. | 355/246 |

*Primary Examiner*—Robert Beatty
*Attorney, Agent, or Firm*—R. Hutter

[57] ABSTRACT

In a printing apparatus for creating images on a sheet in response to digital data, the incoming data is polled for image data corresponding to a preselected density condition, such as a particular half-tone, on an area of the final image. The area having the density condition can be used as a test patch to monitor overall print quality.

16 Claims, 2 Drawing Sheets

SYSTEM FOR IDENTIFYING AREAS IN PRE-EXISTING IMAGE DATA AS TEST PATCHES FOR PRINT QUALITY MEASUREMENT

The present invention relates to a system for identifying locations in an image to be printed which can be used as "test patches" to test the instantaneous quality of a printing system.

In short-run copying or printing systems, such as a xerographic copier, laser printer, or ink-jet printer, a common technique for monitoring the quality of prints is to artificially create a "test patch" of a predetermined desired density. The actual density of the printing material (toner or ink) in the test patch can then be optically measured, by means within the apparatus and often invisible to the user, to determine the effectiveness of the printing process in placing this printing material on the print sheet.

In the case of xerographic devices, such as laser printers, the surface that is typically of most interest in determining the density of printing material thereon is not the print sheet but rather the chargeretentive surface, usually known as a photoreceptor, on which the electrostatic latent image is formed and subsequently developed by causing toner particles to adhere to areas thereof that are charged in a particular way. In such a case, the optical device for determining the density of toner on the test patch, which is often referred to as a "densitometer," is disposed along the path of the photoreceptor, directly downstream of the development unit. There is typically a routine within the operating system of the printer to periodically create test patches of a desired density at predetermined locations on the photoreceptor, by deliberately causing the exposure system thereof to charge or discharge as necessary the surface at the location to a predetermined extent. The test patch is then moved past the developer unit and the toner particles within the developer unit are caused to adhere to the test patch electrostatically. The denser the toner on the test patch, the darker the test patch will appear in optical testing. The developed test patch is moved past a densitometer disposed along the path of the photoreceptor, and the light absorption of the test patch is tested; the more light that is absorbed by the test patch, the denser the toner on the test patch. Of course, if the toner on the test patch does not make the test patch as dark as intended, this is probably indicative of a problem in the printing system, typically either a lack of power in the charging or exposure steps, insufficient charge retention by the photoreceptor, or insufficient toner-carrier ratio in the development system.

In an ink-jet printing apparatus, a test patch may find use as a determinant of a standard value of ink density on the resulting print sheet. In such a case, the test patch is placed by emitting ink from the printhead onto a sheet of the type on which it is desired to print images, and the effect of the ink on the sheet is measured by placing a densitometer along the paper path within the machine. Typically, in ink-jet printing, the parameter of most interest may not be the density of a test patch of complete ink coverage, but rather the density of a halftone coverage, such as a 50% screen. If there are areas covered by ink intermingled with areas intended not to be covered by ink, a crucial concern is the feathering or bleeding of ink into areas on the sheet which are not intended to be covered by ink, in which case a darker than expected reading from a densitometer would be the most likely indicator of print quality defects.

In any printing system using test patches for monitoring print quality, a design problem inevitably arises of where to place these test patches, particularly on photoreceptor belts or drums. A typical design is to provide areas for the placement of test patches in "interdocument zones" between areas along the photoreceptor in which actual images are to be placed. There are some disadvantages to this system. First, it is conceivable that the constant testing of the same particular areas along a photoreceptor, and non-image areas at that, may cause more serious print defects, such as defects in image areas of the photoreceptor, to go undetected. Secondly, the provision of interdocument zones places a design constraint on the placement of image areas on the photoreceptor. Particularly if the photoreceptor has a seam therein that must be avoided in image areas, the provision of test patch areas may require a significant length of unusable portions of the photoreceptor. Thirdly, the use of specific test patch areas interferes with the occasionally desirable design of forming a photoreceptor out of a cylinder of relatively small diameter, such as in portable copiers. In such a case, the circumference of the photoreceptor may be less than the process length of a document being printed. In such a case, there is simply no room along the circumference of the photoreceptor for a dedicated non-image area interdocument zone.

In the case of ink-jet printers, one problem of test patches is that, in order to be truly effective in checking the interaction of ink with a given type of paper, the printer must actually produce a piece of paper having the test patch on it, such as on a cover sheet. In small desk top printers, which currently form the main market for such ink-jet printers, the production of a cover sheet with each job may be considered by a consumer to be a waste of paper.

There is therefore an advantage to be had by providing a capability for a test-patch print quality monitoring system which does not rely on placing test patches in specific non-image areas of a photoreceptor or placing test patches on cover sheets.

U.S. Pat. No. 4,341,461 discloses a control system for an electrophotographic printer, in which two test targets, each having two test patches, are selectably exposed to provide test data in the photoreceptor image area for control of the toner dispensing and bias control loops. In this system, the test patches are imaged in inter-document zones on the photoreceptor.

U.S. Pat. No. 4,684,243 discloses an electrophotographic apparatus including a device for selectably controlling whether or not test patch images are transferred from the photoreceptor to the copy sheets. In this way, someone testing the device may elect to be able to view the test patches that are transferred onto copy sheets, for servicing purposes.

U.S. Pat. No. 5,060,013 discloses a control system using test patches at different locations within the image frame on the photoreceptor. Test patches are placed at various locations in subsequent frames to reduce memory discontinuities encountered when high density areas are repeatedly placed at the same location within an image frame. In this system, the test areas are located directly in place of image areas within the image frame, i.e. the image being printed is altered to accommodate the test patch. A plurality of sensors are provided and arranged to sample the test areas in defined columns of the frame on page output directly corresponding to the frame. The exact location of each test area placement is relayed to a central monitoring device so that measurements can be coordinated with the location of the test area.

According to the present invention, there is provided a method of controlling a printing machine, comprising the steps of forming a visible image of a selected portion of information being printed by the printing machine, and determining the visible image density.

Also according to the present invention, there is provided a system for controlling a printing machine, comprising means for forming a visible image of a selected portion of information being printed by the printing machine, and means for determining the visible image density.

According to another aspect of the present invention, there is provided a method of testing print quality in a printing machine including a densitometer for determining density of printing material at a preselected location on a surface. For an image to be printed, a subset of image data corresponding to a portion of the image in the preselected location of the surface is identified. The subset of image data is polled for a preselected density condition.

Figure 3:
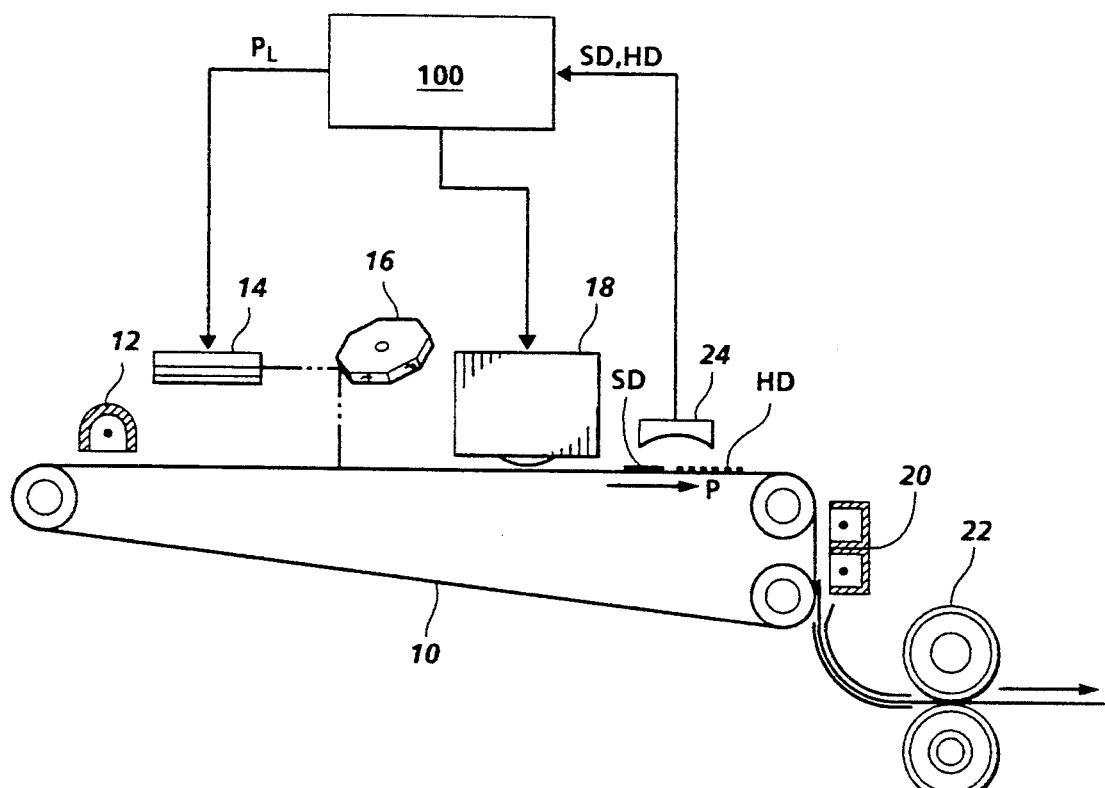
FIG. 3 is an elevational view showing an exemplary electrophotographic printing machine, in which a system of the present invention is used.

FIG. 3 shows the basic elements of the well-known system by which an electrophotographic printer, familiarly known as a "laser printer," uses digital image data to create a dry-toner image on plain paper. There is provided in the printer a photoreceptor 10, which may be in the form of a belt or drum, and which comprises a charge-retentive surface. The photoreceptor 10 is here entrained on a set of rollers and caused to move (by means such as a motor, not shown) through process direction P. Moving from left to right in FIG. 3, there is illustrated the basic series of steps by which an electrostatic latent image according to a desired image to be printed is created on the photoreceptor 10, how this latent image is subsequently developed with dry toner, and how the developed image is transferred to a sheet of plain paper.

The first step in the electrophotographic process is the general charging of the relevant photoreceptor surface. As seen at the far left of FIG. 3, this initial charging is performed by a charge source known as a "scorotron," indicated as 12. The scorotron 12 typically includes an ion-generating structure, such as a hot wire, to impart an electrostatic charge on the surface of the photoreceptor 10 moving past it. The charged portions of the photoreceptor 10 are then selectively discharged in a configuration corresponding to the desired image to be printed, by a raster output scanner or ROS, which generally comprises a laser source 14 and a rotatable mirror 16 which act together, in a manner known in the art, to discharge certain areas of the charged photoreceptor 10. Although the Figure shows a laser source to selectively discharge the charge-retentive surface, other apparatus that can be used for this purpose include an LED bar, or, conceivably, a light-lens system. The laser source 14 is modulated (turned on and off) in accordance with digital image data fed into it, and the rotating mirror 16 causes the modulated beam from laser source 14 to move in a fast-scan direction perpendicular to the process direction P of the photoreceptor 10. The laser source 14 outputs a laser beam of laser power $P_L$ which charges or discharges the exposed surface on photoreceptor 10, in accordance with the specific machine design.

After certain areas of the photoreceptor 10 are (in this specific instance) discharged by the laser source 14, the remaining charged areas are developed by a developer unit such as 18 causing a supply of dry toner to contact the surface of photoreceptor 10. The developed image is then advanced, by the motion of photoreceptor 10, to a transfer station including a transfer scorotron such as 20, which causes the toner adhering to the photoreceptor 10 to be electrically transferred to a print sheet, which is typically a sheet of plain paper, to form the image thereon. The sheet of plain paper, with the toner image thereon, is then passed through a fuser 22, which causes the toner to melt, or fuse, into the sheet of paper to create the permanent image.

The idea of "print quality" can be quantified in a number of ways, but two key measurements of print quality are (1) the solid area density, which is the darkness of a representative developed area intended to be completely covered by toner, and (2) a halftone area density, which is the copy quality of a representative area which is intended to be, for example, 50% covered with toner. The halftone is typically created by virtue of a dot-screen of a particular resolution, and although the nature of such a screen will have a great effect on the absolute appearance of the halftone, as long as the same type of halftone screen is used for each test, any common halftone screen may be used. Both the solid area and halftone density may be readily measured by optical sensing systems which are familiar in the art. As shown in the Figure, a densitometer generally indicated as 24 is here used after the developing step to measure the optical density of a solid test patch (marked SD) or a halftone test patch (HD) created on the photoreceptor 10 in a manner known in the art. Systems for measuring the true optical density of a test patch are shown in, for example, U.S. Pat. Nos. 4,989,985 or 5,204,538, both assigned to the assignee hereof and incorporated by reference herein. However, according to the claims herein, the word "densitometer" is intended to apply to any device for determining the density of print material on a surface, such as a visible-light densitometer, an infra-red densitometer, an electrostatic voltmeter, or any other such device which makes a physical measurement from which the density of print material may be determined.

Figure 1:
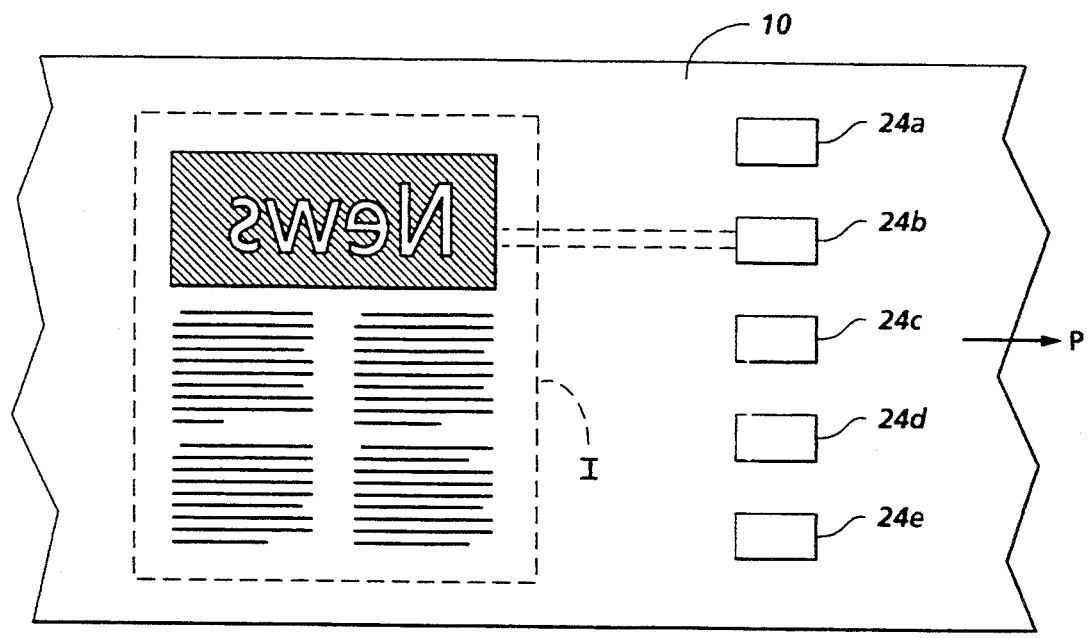
FIG. 1 is a plan view of a portion of a photoreceptor belt, illustrating the operation of the system according to the present invention.

FIG. 1 is a plan view of a section of the photoreceptor belt 10, which moves in the process direction P, particularly in the area of the electrophotographic printer immediately downstream of the developer unit 18 (not shown in FIG. 1). Superimposed in the plan view of FIG. 1 is a set of locations of a plurality of densitometers 24, here individually indicated as 24a, 24b . . . 24e. The purpose of providing a plurality of densitometers and disposing them along an axis perpendicular to the process direction P is to permit each individual densitometer to sample a different "swath" along the photoreceptor belt 10 as it moves in the process direction. There may, according to the invention, be provided a solid line of even more densitometers "covering" up to the entire width of photoreceptor 10, so that all of the photoreceptor width may conceivably be capable of detection by one or another densitometer. Also shown superimposed on the photoreceptor belt 10 is a developed electrostatic image indicated as I, which at this stage in the process of printing has just been electrostatically developed by developer unit 18. The image I is shown reversed, as this latent image will subsequently be transferred to form a positive image onto a sheet.

It will be noted that, in FIG. 1, the image I includes some solid-density areas toward the top thereof (for sake of illustration, this area is actually shown as crosshatched, but it is intended to be of an almost solid density). The particular darkened area of image I will incidentally pass under at least one densitometer, in this case densitometer 24b, as the developed latent image moves from the development unit 18 to the transfer station. Thus, as the developed latent image I moves past the row of densitometers, densitometer 24b will have an opportunity to examine an area of a given size and of solid toner density, much in the manner of a deliberately-created test patch, which happens to be already in the image to be printed by the user. Because there are provided a plurality of such densitometers 24a . . . 24e, the probability will thereby be increased that one or another of the densitometers will eventually be exposed to a portion of a developed latent image which is of a density condition useful for testing purposes.

The multiple densitometers having exposure to various swaths in the developed latent image allow a control system access to what is in effect a "test patch" which has been created incidental to an image which was being created by the user anyway. The advantage of this idea is that no deliberate test patches need be made in inter-document zones along the length of the photoreceptor; among other advantages, this increases the amount of usable length on the photoreceptor belt 10, and may also facilitate the use of a photoreceptor drum with a relatively small circumference.

In order to make use of incidental areas of solid or other density of toner in a developed latent image in the course of the electrophotographic process, the system of the present invention "previews" incoming digital image data being used to create the particular electrostatic latent image to discover any areas within the created image having the requisite toner density to serve as a test patch. In general, in order to serve as a test patch, there must be provided in the image, within one of the areas accessible to one of the densitometers 24a . . . 24e, an area of intended solid toner density of approximately 1 centimeter square. Such areas may be common, for example, within individual large-size letters in certain typefaces. Even smaller test patch areas could be provided for, but at the expense of process speed, as the various densitometers need a minimum time-window in which they can measure the density of a test patch moving past.

Figure 2:
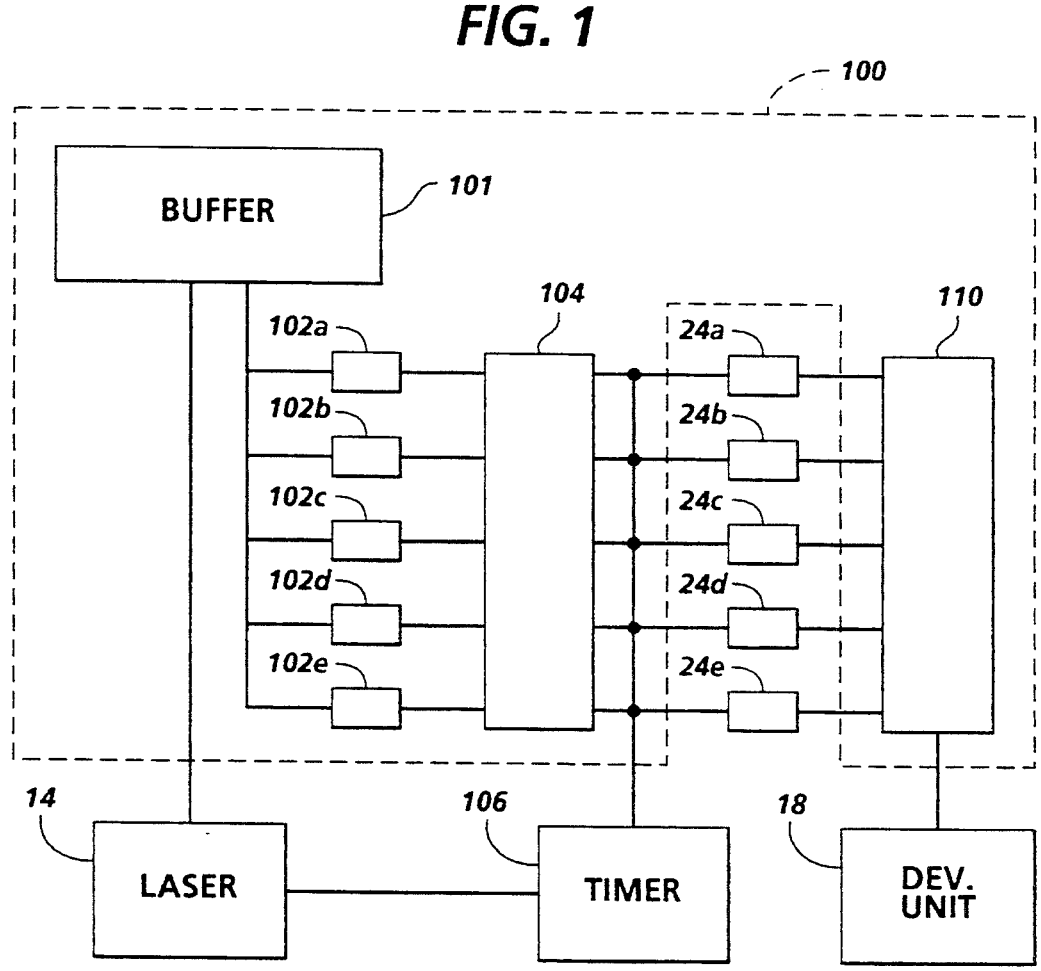
FIG. 2 is a systems diagram illustrating one possible embodiment of the present invention.

FIG. 2 is a simplified systems diagram showing how an incoming batch of digital data forming a single print job can be previewed, to find suitable test patches within the original digital data, which can in turn be used to determine and correct for print quality, as would occur in a controller such as shown generally as 100 in FIG. 3 and here shown in dotted lines around certain functional elements. A job, in the form of a quantity of digital image data, enters the system through a buffer 101, ultimately for printing through laser source 14, which corresponds to the laser source shown in FIG. 3. With each job, a portion of the digital data forming the single or series of latent images is copied and organized into subsets of "swath data," each set of swath data being related only to those pixels within the complete job which are at any time accessible by the densitometers 24a . . . 24e. These subsets are shown as 102a . . . 102e in FIG. 2. As claimed herein, the image data corresponding to these subsets are polled for a preselected "density condition"; in the preferred embodiments hereof, such polling may involve the detection of data consistent with a test-patch size area of pixels of a certain density, or else simple averaging of samples of pixel data within the subset for the derivation of a detectable halftone therefrom.

Typically, each swath is approximately 1 centimeter wide, the size ultimately depending on the physical size of the densitometers. In a 300 spot per inch system, the swath must be approximately 75 pixels wide. With the five densitometers in this embodiment, with each scan of the photoreceptor 10, $75 \times 5 = 375$ pixels are of interest. (In a raster-output scanner as shown by laser source 14 and rotating mirror 16, as is well known in the art, the "scans" of the scanner place the desired image on the photoreceptor in successive lines prependicular to the scan direction.)

The identification of relevant image data in which data representative of incidental test patches may be found can most readily be performed at page decomposition time, when the data associated with the particular job "arrives" at the printing apparatus, or when the incoming data is first temporarily stored in a buffer; that is, if the image data is analyzed before the data is actually used to modulate a laser source such as 14, the computation time for finding incidental test patches will not seriously slow down the printing process itself. Thus, although the present discussion and illustrations may imply that the analysis according to the present invention is carried out immediately prior to or simultaneously with the actual printing process, it is to be understood that the analysis of the image data may occur well before the data is actually used to control the printing apparatus.

Turning first to the test-patch detection embodiment of the invention, the subsets of swath data are fed into a detector 104, which polls the incoming image data for a quantity of contiguous image data (i.e., data corresponding to pixels in the final image which form a substantially contiguous mass) having a preselected density property. In the preferred embodiment, what is of interest to the detector 104 is the presence of, within individual swaths, a number of scans having a number of print-black pixels within a range usable as a test patch, whether the test patch is a solid-density or halftone. In general, the block of pixels must create a 1 centimeter square test patch. The detector 104 polls the data for a series of approximately 75 contiguous scan lines within each swath, each having a number of print-black pixels within the desired range, so that a 1 centimeter square area having a certain number of print-black pixels will be detected on the final image by a densitometer in a known position. This area, if found, can be used as an incidental test patch. Such a system for detecting these test patches would be within ordinary skill in the art of digital design.

The detector 104 can poll for a substantially solid-area density set of data, or a proportion of print-black pixels within a certain limited range consistent with a certain halftone, or, conceivably, either, as such patches become available. For example, it may be useful if the detector 104 could detect a discrete area having a ratio of print-black to print-white pixels of between 45% and 55%, in order to simulate a 50% halftone. A 50%-range halftone test patch may be particularly useful if the data is activating not a laser source, as in the illustrated embodiment, but an ink-jet printhead, wherein halftone area densities may be of more interest than solid area densities.

A somewhat simpler technique for operation of the densitometers 24a . . . 24e would be to have a particular densitometer sample the density of printing material on a given image throughout the entire length of the swath in the process direction (i.e. not just in a compact test patch area), and compare this average value across the swath to an average of the pixel data contained in this swath. In such a case, the function of detector 104 would be to accumulate a record of pixel values of each image to be printed, at relatively low resolution, that fall along the swath accessible to each densitometer. Depending on the relative sizes of the densitometer and the image, the instantaneous density of locations along the swath as the image moves through the process direction may be averaged over a relatively large number of data samples, such as 256. The average intended data value across the swath is then compared to the actual average density read by a given densitometer. If, for example, the data across the entire swath of a particular image includes 50% print-black pixels and 50% print-white pixels, the entire length of the swath could be deemed a 50% halftone for purposes of comparison to the actual (average) density detected by the densitometer. However, with the realities of electrostatic printing, if the print-black area were concentrated in one solid area along the length of the swath with the rest print-white, the actual print quality may be misleadingly detected one way or another, particularly compared to a case in which the bulk of the length of the swath were a relatively evenly distributed 50% halftone screen, and this distortion must be considered when using this "averaging" technique.

If the "test-patch" technique is used, once data consistent with a suitable test patch area is found within the image to be printed, the detector 104 may be utilized to activate the relevant densitometer 24a . . . 24e when that test patch happens to pass the densitometer. Because of the finite speed of a photoreceptor belt 10 through a machine, there will of course be an appreciable time lag between creation of the electrostatic latent image by laser source 14, and the post-development detection of this test patch by one of the densitometers. For this reason, a time coordination between creation of the latent image and measurement of the developed image must be carried out, and for this purpose there is provided a timer 106. Timer 106 is adapted to activate the necessary densitometer at a certain fixed time after the latent image creating the test patch is created by laser source 14 (or, as necessary, a fixed time after the creation of the image by an ink-jet printhead). Activation of the necessary densitometer at the correct time after detection of the suitable test patch is well within the capability of a person skilled in the art of microprocessor programming.

If the "averaging" technique is used, however, the given densitometer may take an average reading of the density across the entire length of the swath as the image moves past the densitometer, and the comparison made between this average reading and the proportion of print-black to print-white pixels in the underlying data. In other words, in the averaging technique, the value of the "halftone" is determined by the data itself, and the average densitometer reading over the whole swath is compared to this halftone value.

In a practical application of a technique according to the present invention, detector 104 would poll the swath data for when an "interesting" halftone value (i.e., a halftone value for which the system can perform a relevant print-quality test) becomes available, and otherwise would stay in a "don't care" state, in which no densitometer would be activated. As it happens, it may be practical to provide a print-quality monitoring system which is able to make use of a large number of possible halftone test patch values, such as 100%, 75%, 50%, 10%, 5%, and/or even 0%, and perform useful print-quality tests. In this way a preferred design for obtaining a sufficiently large sample of incidental test patches would be to provide not a plurality of densitometers for monitoring a plurality of locations on the photoreceptor, but rather to provide one densitometer and a testing system which is capable of making use of a large number of different halftone values. In this way the chance of a useful halftone value passing the one densitometer will be increased in a manner similar to providing a plurality of densitometers, and probably at a lower cost.

Once the density of an incidental test patch is measured, the reading of the actual density can then be used to cause a adjustment, if necessary, to the operation of the machine for a print quality correction. Such a control device is generally shown as 110 in FIG. 3. One typical technique for correcting the density on subsequent test patches is to adjust the AC or DC bias on the development unit 18, in a manner of which several are known in the art. Similarly, in an ink-jet printing apparatus, correction may be obtained by adjusting the drive voltage of the printheads and/or the pulse width within the printhead; in such a case, what is shown as box 18 in FIG. 2 could be interpreted as a controller for an ink-jet printhead. In the claims, any station or sub-system within the printing machine which has a direct and controllable bearing on the print quality, such as a development unit or printhead controller, is recited as a "process station."

With graphics and word-processing applications which are currently in popular use even in very low end personal computer and home-office printing situations, it is likely that the simple graphics readily producible by such application programs will create sufficient opportunities, in the form of 1-centimeter square areas of solid density, to make the system of the present invention practical. Even if such an opportunity presents itself only within one page out of fifty, that may still be enough "feedback" to the control system of the printer itself for sufficiently monitored operation.

The system of finding incidental test patches of the present invention may be used in conjunction with larger systems in which test patches are also deliberately created, as in interdocument zones. In certain high-quality printing systems, it is often necessary to provide both solid-density and halftone-screen test patches for controlling print quality. The necessity for multiple different test patches can mandate a system that can look for incidental test patches in the intended images of both types of density. If a certain type of test patch, say the solid-density test patch, becomes available fairly often in the course of printing certain images, the system can further be designed to deliberately create test patches of the other type, such as 50% halftone patches, in interdocument zones as necessary. In this way a system of the present invention can be used not only as a substitute for, but also as a supplement to, a system which deliberately creates test patches as well.

While this invention has been described in conjunction with a specific apparatus, it is evident that many alternatives, modifications, and variations will be apparent to those skilled in the art. Accordingly, it is intended to embrace all such alternatives, modifications, and variations as fall within the spirit and broad scope of the appended claims.

I claim:

1. A method of controlling a printing machine, comprising the steps of:
    forming a visible image of a selected portion of information being printed by the printing machine;
    polling the portion of information for information consistent with an area in the visible image having a preselected density condition; and
    determining the visible image density in the area having the preselected density condition.

2. The method of claim 1, further comprising the step of controlling a process station in the printing machine as a function of the visible image density determined in said determining step.

3. The method of claim 1, further comprising the step of selecting the portion of information as that information which corresponds to an area of the visible image which is detectable by a densitometer disposed within the printing machine.

4. The method of claim 1, further comprising the steps of
    selecting a plurality of portions of information, each portion corresponding to an area of the visible image which is detectable by one of a plurality of densitometers disposed within the printing machine;
    polling each portion of information for information consistent with an area in the visible image having a preselected density condition; and
    activating one of the plurality of densitometers where the preselected density condition exists, to determine the visible image density in the area having the preselected density condition.

5. A system for controlling a printing machine, comprising:
    an image receiving member;
    means for forming a visible image of a selected portion of information being printed by the printing machine on the receiving member;
    means for polling the portion of information for information consistent with an area in the visible image having a preselected density condition; and
    means for sensing the area having the preselected density condition on the receiving member.

6. The system of claim 5, further comprising means for controlling a process station in the printing machine as a function of the visible image density determined by the sensing means.

7. The system of claim 5, further comprising means for selecting the portion of information as that information which corresponds to an area of the visible image which is detectable by the sensing means.

8. The system of claim 5, wherein the sensing means comprises a plurality of densitometers disposed adjacent the receiving member.

9. The system of claim 8, further comprising
    means for selecting a plurality of portions of information as that information which corresponds to an area of the visible image which is detectable by one of the plurality of densitometers;
    means for polling each portion of information being printed by the printing machine for information consistent with an area in the visible image having a preselected density condition; and
    means for activating one of the plurality of densitometers where the preselected density condition exists, to determine the visible image density in the area having the preselected density condition.

10. A method of testing print quality in a printing machine, comprising the steps of:
    polling the subset of image data for image data corresponding to a preselected density condition; and
    identifying, for an image to be printed, image data corresponding to a preselected density condition within a subset of image data corresponding to a preselected location of the image to be printed.

11. The method of claim 10, wherein the polling step includes the step of polling the subset of image data for a quantity of contiguous image data having a preselected density condition.

12. The method of claim 10, wherein the polling step includes the step of averaging a sample set of density values of image data in the subset.

13. The method of claim 10, further comprising the steps of:
    creating an image on a surface according to the image data;
    moving the surface through a path; and
    identifying a subset of image data as data corresponding to a portion of the image that passes near the densitometer when the surface moves through the path.

14. The method of claim 10, further comprising the steps of:
    creating an image on a surface according to the image data;
    determining a density of printing material at a preselected location on the surface having the preselected density condition; and
    controlling a process station in the printing machine as a function of the density of printing material.

15. The method of claim 10, wherein the printing machine includes a plurality of densitometers for determining density of printing material at corresponding preselected locations on a surface, further comprising the step of identifying, for an image to be printed, a plurality of subsets of image data, each subset corresponding to a portion of the image in one preselected location of the surface.

16. The method of claim 15, further comprising the steps of:
    polling each subset of image data for image data corresponding to a preselected density condition; and
    activating one of the plurality of densitometers corresponding to the subset of image data having the preselected density condition.

* * * * *